United States Patent
Danilevich et al.

(10) Patent No.: US 11,168,555 B2
(45) Date of Patent: Nov. 9, 2021

(54) METHOD FOR TEMPORARY ISOLATION OF WELL INTERVAL, METHOD FOR HYDRAULIC REFRACTURING, AND METHOD FOR WELL KILLING

(71) Applicant: SCHLUMBERGER TECHNOLOGY CORPORATION, Sugar Land, TX (US)

(72) Inventors: Elena Vladimirovna Danilevich, Novosibirsk (RU); Sergey Dmitrievich Parkhonyuk, Novosibirsk (RU); Nikita Yurievich Silko, Koltsovo (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 41 days.

(21) Appl. No.: 16/620,597

(22) PCT Filed: Jun. 9, 2017

(86) PCT No.: PCT/RU2017/000394
§ 371 (c)(1),
(2) Date: Dec. 9, 2019

(87) PCT Pub. No.: WO2018/226113
PCT Pub. Date: Dec. 13, 2018

(65) Prior Publication Data
US 2021/0140293 A1     May 13, 2021

(51) Int. Cl.
*E21B 33/13*     (2006.01)
*E21B 43/26*     (2006.01)
(Continued)

(52) U.S. Cl.
CPC ............ *E21B 43/26* (2013.01); *C09K 8/44* (2013.01); *C09K 8/467* (2013.01); *C09K 8/5045* (2013.01);
(Continued)

(58) Field of Classification Search
None
See application file for complete search history.

(56) References Cited

U.S. PATENT DOCUMENTS 5,607,905 A  * 3/1997 Dobson, Jr. .............. C09K 8/08
                                                             507/211
7,380,600 B2    6/2008 Willberg et al.
(Continued)

OTHER PUBLICATIONS

International Preliminary Report on Patentability of International Patent Application No. PCT/RU2017/000394 dated Dec. 19, 2019; 9 pages.
(Continued)

*Primary Examiner* — Andrew Sue-Ako

(57) ABSTRACT

A method for temporary isolation of a well interval is proposed, the method comprising: pumping a first slurry into the well, the slurry comprising a viscous carrier fluid, degradable particulates, and degradable fibers, until a first filter cake is formed; and pumping a second slurry into the well, the slurry comprising a viscous carrier fluid, non-degradable particulates, and degradable fibers, until a second filter cake is formed. The first and the second slurries are not mixed when pumped into the well. To ensure optimum interval isolation, the ratio of the volume of the first slurry to the volume of the second slurry should be in the range 1:5 to 2:1.

A method for hydraulic refracturing within an interval with several hydraulic fractures and a non-damaging well killing method are also proposed.

The technical result is manifested in no formation damage and degradation of the sealing layer formed.

13 Claims, 1 Drawing Sheet

(51) Int. Cl.

| | |
|---|---|
| *C09K 8/44* | (2006.01) |
| *C09K 8/467* | (2006.01) |
| *C09K 8/504* | (2006.01) |
| *C09K 8/508* | (2006.01) |
| *C09K 8/514* | (2006.01) |
| *C09K 8/516* | (2006.01) |
| *C09K 8/68* | (2006.01) |
| *C09K 8/70* | (2006.01) |
| *E21B 33/14* | (2006.01) |

(52) U.S. Cl.
CPC ............ *C09K 8/5086* (2013.01); *C09K 8/514* (2013.01); *C09K 8/516* (2013.01); *C09K 8/68* (2013.01); *C09K 8/70* (2013.01); *E21B 33/13* (2013.01); *E21B 33/146* (2013.01); *C09K 2208/08* (2013.01); *E21B 2200/08* (2020.05)

(56) References Cited

U.S. PATENT DOCUMENTS

| | | | |
|---|---|---|---|
| 7,575,062 B2 | 8/2009 | East, Jr. | |
| 7,775,278 B2 | 8/2010 | Willberg et al. | |
| 8,167,043 B2 | 5/2012 | Willberg et al. | |
| 8,905,133 B2 | 12/2014 | Potapenko et al. | |
| 9,085,727 B2 | 7/2015 | Litvinets et al. | |
| 2006/0124304 A1 | 6/2006 | Bloess et al. | |
| 2006/0157248 A1* | 7/2006 | Hoefer | C09K 8/68 |
| | | | 166/300 |
| 2013/0085412 A1 | 4/2013 | Timberlake et al. | |
| 2015/0252649 A1* | 9/2015 | Tang | C09K 8/565 |
| | | | 166/295 |
| 2016/0290115 A1 | 10/2016 | Fleming et al. | |
| 2016/0333680 A1 | 11/2016 | Richter et al. | |

OTHER PUBLICATIONS

International Search Report issued in International Patent Appl No. PCT/RU2017/000394 dated Sep. 28, 2017; 2 pages.

English translation of International Search Report issued in International Patent Appl. No. PCT/RU2017/000394 dated Sep. 28, 2017; 1 page.

Written Opinion issued in International Patent Appl. No. PCT/RU2017/000394 dated Sep. 28, 2017; 5 pages.

Office Action issued in Russian Patent Application No. 2019135958 dated Aug. 14, 2020; 16 pages (with English translation).

* cited by examiner

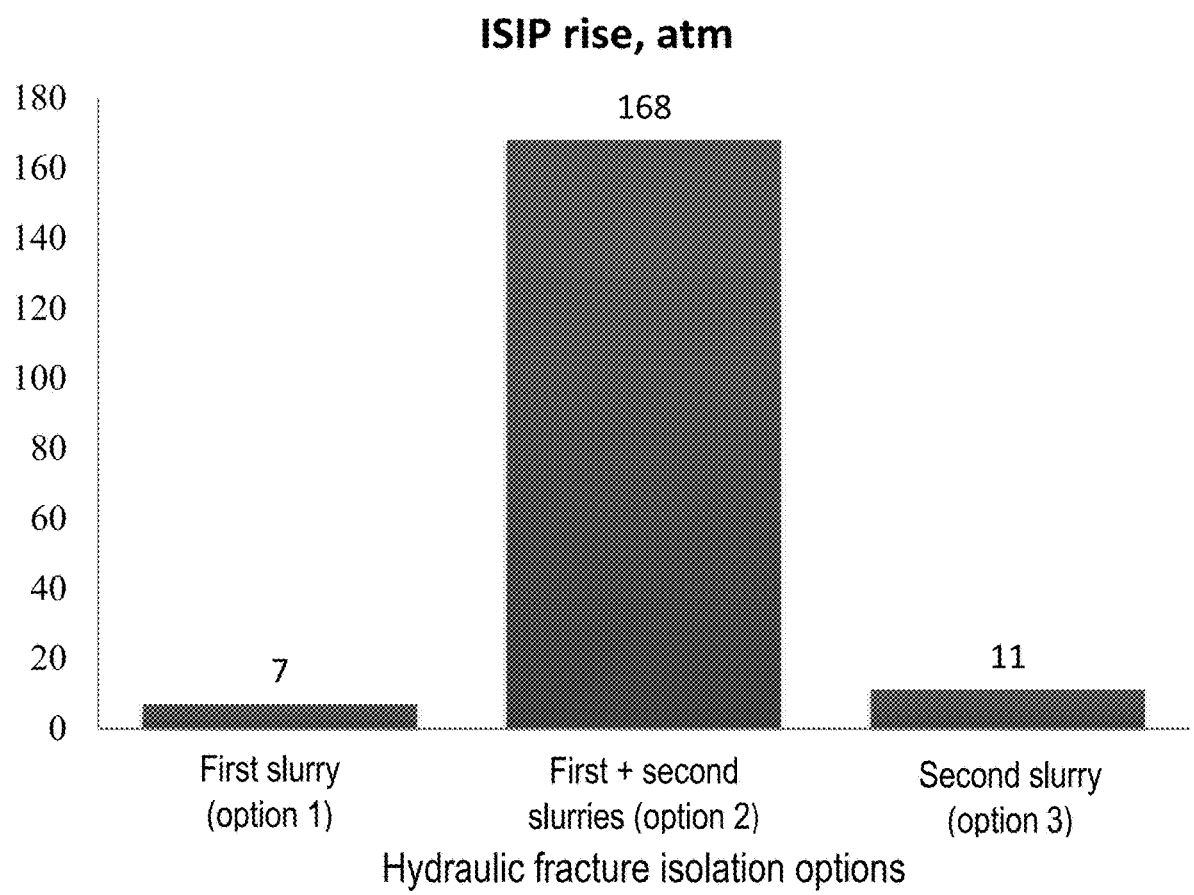

METHOD FOR TEMPORARY ISOLATION OF WELL INTERVAL, METHOD FOR HYDRAULIC REFRACTURING, AND METHOD FOR WELL KILLING

The present disclosure relates to the oil and gas industry and may be useful in stimulation of a subterranean formation using hydraulic fracturing operations, particularly for temporary isolation of hydraulic fractures, for hydraulic refracturing, as well as in well-killing operations.

BACKGROUND

In oil and gas production practices, multi-zone stimulation of an oil-bearing formation is used, which means arranging several perforation intervals in a cased wellbore and creating several fractures as a result of hydraulic fracturing. In the course of production, some hydraulic fractures lose their efficiency thus perform the operation of temporary isolation of the perforation interval when performing hydraulic refracturing (refrac) operations or other maintenance operations (temporary well killing).

Methods and compositions are known which are based on degradable solid materials (typically a mixture of particulates and fibers) which are pumped in the form of a slurry in a carrier fluid toward the hydraulic fracture entrance. This approach is described in U.S. Pat. No. 8,167,043 or 8,905,133. This well treatment method is known as DMAD (Degradable Material Assisted Diversion).

At the same time, the particulates and fibers of a degradable material (synthetic polymers hydrolyzable in the well environment, such as, e.g., polylactic acid (PLA) or polyglycolic acid (PGA)) are not always available in sufficient amounts, or the particle size distribution does not allow temporary isolation of fractures and perforations in the well.

The US Pat. App. No. 2016/0290115 "Re-fracturing a fracture stimulated subterranean formation" describes a method for placing a temporary sealant slurry comprising a slurry base fluid, non-degradable particulates, degradable particulates, and a stabilizing agent (the sticky coating on particulates). After the temporary sealant slurry is placed, refracturing is performed at the point of the new perforation.

On the other hand, when inert (non-degradable) particulates in the form of ground minerals or salts (calcium carbonate, talc, mica, fine silica, graphite) used for temporary isolation in well operations are pumped into the well, they impact the oil-bearing formation, that is, the formation is damaged by infiltration of small particulates with the size close to the pore size. The "formation damage" effect means the penetration of small inert particulates into the pore space of the fracture (in particular, into the pores between proppant granules) or the pores of the surrounding rock. Since such inert particulates are insoluble in the well treatment fluid or the formation oil fluid, the permeability of the surrounding rock and the propped hydraulic fracture decreases irreversibly, which eliminates the well stimulation effect.

Further, the term "isolation" of an interval, perforation, or fracture is understood as a reduction (5-fold or more) in the treatment fluid influx through the object of isolation after the sealant slurry is placed as a filter cake (filtering layer). At the same time, a portion of the fluid continues to infiltrate through the filter cake. During well operations, the event of isolation of the perforation interval against the backdrop of steady operation of the pump manifests itself as a sharp pressure jump, because the fracturing fluid penetration rate into the formation has been reduced. In this disclosure, the measure of interval isolation is the pressure difference at the object of isolation ($\Delta P$ in bars).

Therefore, the present disclosure describes a method that combines the advantages of using degradable particulates and non-degradable particulates for temporary isolation of a well interval while avoiding the adverse effect of small non-degradable particulates on hydraulic fracture conductivity.

When a well killing operation is performed, the pore pressure of the rock should be offset by the hydrostatic pressure of the killing fluid, but, at the same time, the fluid communication between the formation and the wellbore should be minimized. To achieve both goals, the permeability of fissured rock intervals or artificial hydraulic fractures is reduced. Following the killing and workover operations, the permeability of the near-wellbore rock should be restored to resume the production of hydrocarbons. One of the well killing methods is the use of additives or block compositions based on finely dispersed solid phase. This is how the REABLOCK™ block composition (M-I SWACO, a Schlumberger Company, USA) is applied. This block composition for killing operations is based on a mixture of carbonate particulates of various particle sizes. Such particulates seal the permeable rock and prevent lost circulation of the fluid. When the well production is resumed, the permeability of the formation should be restored, and the latter may be achieved by acid treatment of the killed zone. However, in some cases acid treatment fails to completely restore the permeability, which reduces the well productivity after temporary killing.

Therefore, the present disclosure describes a non-damaging well killing method, where formation permeability can be restored without additional well cleanout operations.

SUMMARY

A method for temporary isolation of a well interval is proposed. The process starts with pumping the first slurry into the well until a first filter cake is formed. The first slurry comprising a viscous carrier fluid, degradable particulates, and degradable fibers. Then a second slurry is pumped into the well until a second filter cake is formed. The second slurry is comprising a viscous carrier fluid, non-degradable particulates, and degradable fibers. The first and the second slurries are not mixed, and the ratio of the volumes of the first slurry to the second slurry is 1:5 to 2:1.

The formation of the second filter cake over the first filter cake creates a double sealing layer, which isolates (seals off) the wellbore intervals with high fluid losses.

A method for hydraulic refracturing is also proposed. The method comprises pumping a first slurry into the well until a first filter cake is formed. The first slurry containing a viscous carrier fluid, degradable particulates, and degradable fibers. Then a second slurry is pumped into the well until a second filter cake is formed. The second slurry is comprising a viscous carrier fluid, non-degradable particulates, and degradable fibers. The first and the second slurries are not mixed, and the ratio of the volumes of the first slurry to the second slurry is 1:5 to 2:1. The wellbore pressure is then increased to a level above the hydraulic fracturing pressure, and a hydraulic fracturing operation at a new point, or a refracturing operation for the selected fracture, is performed.

A well killing method is also proposed, in which a first slurry is pumped into the well, the slurry comprising a viscous carrier fluid, degradable particulates, and/or degradable fibers, until a first filter cake is formed. Then a second slurry is pumped into the well, the slurry comprising a viscous carrier fluid, non-degradable particulates, and degradable fibers, until a second filter cake is formed. The first and the second slurries are not mixed, and the ratio of the volume of the first slurry to the volume of the second slurry is 1:5 to 2:1.

The double filter cake formed provides reliable (but non-damaging) isolation for the selected wellbore interval, which allows the wellbore pressure to be reduced (well killing operation).

BRIEF DESCRIPTION OF DRAWINGS

FIG. 1 shows a graph which compares the efficiency of hydraulic fracture isolation operations using different sealing compositions delivered to the point of isolation.

DETAILED DESCRIPTION

The proposed methods are based on pumping slurries of particulates and fibers into well intervals for temporary isolation (that is, where the fluid influx from the wellbore to the rock should be reduced). Pumping a slug of slurry through a porous rock result in the creating of a filter cake which self-seals the porous surface over time. Also, the composition of the formed filter cake determines the strength and stability of the filter cake. Within the context of this disclosure, the terms "double filter cake" and "sealing layer" should be understood as equivalent.

The term "non-damaging isolation" in this disclosure means that the filter cake material degrades over time, and the rock (or hydraulic fracture) conductivity is restored.

The term "well killing" means that the production of oil-containing fluid or the influx of the formation fluid into the wellbore is brought to a halt using various measures, and differs from the operation of well operation interruption by closing the wellhead valves (when high pressure is maintained).

Temporary Isolation of a Well Interval with Hydraulic Fractures

The method for temporary isolation of a well interval comprises:

(1) pumping the first slurry into the well, the slurry comprising a viscous carrier fluid, degradable particulates, and degradable fibers until a first filter cake is formed; and (2) pumping a second slurry into the well, the slurry comprising a viscous carrier fluid, non-degradable particulates, and degradable fibers until a second filter cake is formed.

The first and the second slurries are pumped in sequence. The first and the second slurries are not mixed, and the ratio of the volume of the first slurry to the volume of the second slurry is 1:5 to 2:1.

The second filter cake formed over the first filter cake creates a double sealing layer, which isolates (seals off) the wellbore intervals with a high rate of fluid losses.

In the temporary isolation method, an aqueous solution of a thickening polymer, or an emulsion, is selected as a viscous carrier fluid. The viscous carrier fluid acts as a carrier for the particulates of the first and the second slurries.

Since the isolation of an interval is of temporary nature (degradation of the sealing material within several days), degradable particulates and degradable fibers are selected from among degradable polymers, such as polylactic acid, a polyglycolic acid, and other degradable polyesters.

The second filter cake is more stable in a water medium, and such materials as calcium carbonate, silica, aluminosilicates, or bauxites are selected as non-degradable particulates for the second slurry.

In the first slurry, the concentration of degradable particulates is from 8 to 90 kg/m$^3$, and the concentration of degradable fibers is from 2 to 12 kg/m$^3$.

In the second slurry, the concentration of non-degradable particulates is from 15 to 100 kg/m$^3$, and the concentration of degradable fibers is in the range of 1 to 4 kg/m$^3$.

A higher concentration of particulates in the slurries can lead to problems in the operation of pumping and mixing equipment (plugging of valves and seats of the equipment by particulates).

In the first slurry, the length of degradable fibers is from 3 to 10 mm.

In the first slurry, the size of the degradable particulates is in the range of 0.01 to 5 mm. In the second slurry (pumped to create the second filter cake), the size of non-degradable particulates is in the range of 0.01 to 1 mm.

The first and the second slurries are not mixed when supplied to the wellhead. Slugs of the first and the second slurries may be further separated by an additional slug of the viscous fluid (aqueous solution of the thickening polymer).

Hydraulic Refracturing Method (after Temporary Isolation of a Well Interval) Hydraulic refracturing is performed as a sequence of the following operations:

(1) pumping the first slurry into the well, the slurry comprising a viscous carrier fluid, degradable particulates, and degradable fibers until a first filter cake is formed; and (2) pumping a second slurry into the well, the slurry comprising a viscous carrier fluid, non-degradable particulates, and degradable fibers until a second filter cake is formed.

The first and the second slurries are not mixed (the second slurry is pumped after the first one), and the ratio of the volume of the first slurry to the volume of the second slurry is 1:5 to 2:1.

At the stage (3), the wellbore pressure is increased to a level above the hydraulic fracturing pressure, and a hydraulic fracturing operation at a new point (or a refracturing operation for the selected fracture) is performed. The new (or expanded) fracture is then filled with a proppant slurry (for example, coarse sand), and the pressure is reduced to close the propped fracture. The new hydraulic fracture (or expanded old hydraulic fracture) enlarges the area of formation stimulation.

Degradable particulates and degradable fibers are selected from among degradable polymers, such as polylactic acid, a polyglycolic acid, and other degradable polyesters.

Such materials as calcium carbonate, silica, aluminosilicates, or bauxites are selected as non-degradable particulates for the second slurry.

In the first slurry, the concentration of degradable particulates is from 8 to 90 kg/m$^3$, and the concentration of degradable fibers is from 2 to 12 kg/m$^3$.

In the second slurry, the concentration of non-degradable particulates is from 15 to 100 kg/m$^3$, and the concentration of degradable fibers is in the range from 1 to 4 kg/m$^3$.

The length of degradable fibers in the first slurry is from 3 to 10 mm.

In the first slurry, the size of the degradable particulates is in the range of 0.01 to 5 mm.

In the second slurry, the size of the non-degradable particulates is in the range of 0.01 to 1 mm.

The first and the second slurries are not mixed when supplied to the wellhead. Slugs of the first and the second slurries may be further separated by an additional slug of the viscous fluid (aqueous solution of the thickening polymer).

Well Killing Method Before Workower Operations

At the first stage, the first slurry of degradable fibers dispersed in a carrier fluid is pumped into the killing zone. When the carrier fluid is filtered, a first filter cake is formed on the wellbore walls. It is estimated that, for typical concentrations of degradable fibers in the slurry, the permeability of the first (primary) filter cake is about 1 Darcy, which is insufficient for the well killing operation, but sufficient for pumping the second slurry of particulates, which will move to the zone with a high rate of treatment fluid loss.

At the second stage, the second slurry based on a carrier fluid, in which fine (inert) particulates are dispersed, is pumped into the killing zone. The second stage is performed immediately after the first stage, and the first and the second slurries are not mixed during the pumping. This allows the creation of the second filter cake over the first one, and this double layer creates a strong filter cake with low permeability.

Since the killing operation is of a temporary nature, degradable particulates and degradable fibers are selected from degradable polymers, such as polylactic acid, a polyglycolic acid, and other degradable polyesters. The duration of degradation depends on the wellbore temperature and the degradable material selected. For example, there are slurries of a degradable material known under the trade name of BroadBand Sequence™ (Schlumberger) designed for low, medium, and high temperatures in the borehole fluid.

Since the second filter cake is more stable in a water medium, such materials as calcium carbonate, silica, aluminosilicates, or bauxites are selected as non-degradable particulates for the second slurry.

In the first slurry, the concentration of degradable particulates is from 8 to 90 kg/m$^3$.

In the second slurry, the concentration of non-degradable particulates is from 15 to 100 kg/m$^3$.

When the pressure in the wellbore of the killed well is reduced, maintenance operations may be performed. When the maintenance operations are complete, the double filter cake formed is removed due to the pressure drawdown in the wellbore (the filter cake is washed out by the formation fluid influx) or using moderate acid treatment (decomposition of calcium carbonate particulates in an acidic medium). Since the small inert particulates of the second slurry did not penetrate into the rock but were deposited over the first filter cake, the rock permeability can be restored to the initial level. This well killing operation is classified as non-damaging killing.

EXAMPLES

Example 1. Applicability of a Double Slug of Slurry for Hydraulic Fracture Isolation As an example, a hydraulic refracturing operation was performed on a horizontal well at a depth of 2,400 meters drilled in an oil and gas formation. The well was completed with a multistage hydraulic fracturing assembly with swellable packers. This assembly allows sequential pumping of the sealing slug into the hydraulic fractures numbered 1, 2, 3 (via frac ports 1, 2, 3).

Different schedules of the sealant material pumping were tested: pumping the first slurry, pumping the second slurry, as well as pumping a dual pill: the first slurry, followed by pumping of the second slurry. The total volume of the sealing slugs was the same and was equal to 3 m$^3$.

The compositions of the first and the second slurries are shown in Tables 1 and 2. To prevent the slurry breakdown, particulates and fibers were suspended in an aqueous guar gum solution with a concentration of 3.6 kg/m$^3$ and at pH of 8.0. This concentration of linear gel (i.e., without a cross-linking agent) ensures the slurry viscosity within the range of 50-100 cP, which is sufficient for delivering the slurry to the point of isolation in the wellbore.

TABLE 1

| First slurry composition | |
| --- | --- |
| Component | Concentration |
| Polylactic acid (PLA) particulates | 12 kg/m$^3$ |
| Degradable fibers (PLA) | 12 kg/m$^3$ |
| Linear gel with polymer (guar gum) | 3.6 kg/m$^3$ |

TABLE 2

| Second slurry composition | |
| --- | --- |
| Component | Concentration |
| Calcium carbonate particulates (non-degradable) | 20 kg/m$^3$ |
| Degradable fibers (PLA) | 2 kg/m$^3$ |
| Linear gel with polymer (guar gum) | 3.6 kg/m$^3$ |

Pumped volumes of slurries (three options) are shown in Table 3 below.

TABLE 3

| Volumes of pumped slurries during hydraulic refracturing | | |
| --- | --- | --- |
| Sealant Slurry | First Slurry Volume | Second Slurry Volume |
| Option 1 (degradable material) | 3 m$^3$ | 0 |
| Option 2 (two successive slurries with a ratio of 1:1) | 1.5 m$^3$ | 1.5 m$^3$ |
| Option 3 (non-degradable material) | 0 | 3 m$^3$ |

One of the criteria of successful isolation is a positive ISIP (instantaneous shut-in pressure) gain during the pumping of the slurry into the hydraulic fracture. A high hump in the pressure caused by fracture isolation and the absence of fluid leakage into the fracture indicates reliable isolation of the hydraulic fracture. The sealing slugs pumped by a slight instantaneous pressure rise are unstable and are easily washed out when the flow conditions are changed (unreliable isolation).

FIG. 1 shows the instantaneous shut-in pressure change measurements (metrics for stability of the filter cake) for different options of slurry pumping.

As can be seen from the graph, the sequential pumping of the first slurry until the first filter cake is formed, and then the pumping of the same volume of the second slurry until the second filter cake is formed, is efficient for hydraulic fracture isolation.

A double slug of the sealing composition was pumped into an interval of the horizontal well at a depth of 2,400 meters with an assembly in the form of three open frac ports according to option two from Table 3. This ensures temporary isolation of two out of three fractures with the maximum intake capacity of the hydraulic fracturing fluid. After that, the wellbore pressure was increased to the hydraulic fracturing pressure ($P_{frac}$), and the third hydraulic fracture was developed to increase the contact area of the fracture with the surrounding rock. The same method is applicable for creating a new hydraulic fracture after temporary isolation of the existing hydraulic fractures.

After two days of temporary isolation of hydraulic fractures, the first filter cake degraded (the rock temperature in this interval was 90-95° C., which is sufficient for the degradation of PLA particulates and fibers). After that, the conductivity of the hydraulic fractures numbered 1, and 2 was restored, indicating that temporary isolation is non-damaging in nature owing to the overlapping of the second filter cake over the first filter cake.

Example 2. Laboratory Testing of the Sealing Properties of Slurries

Two slurries (first and second) were prepared in an aqueous solution of a thickening agent (3.6 kg/m³ of guar gum) at pH=8.0. The viscosity of the carrier fluid does not allow particulates and fibers to settle when pumped (a homogeneous slurry).

Ground calcium carbonate ($CaCO_3$) particulates of various sizes were selected as non-degradable (inert) particulates for the second slurry. Inert particulates can also be selected from among the group of silica, aluminosilicates, or bauxites with the particle size (in the range from 0.01 to 1 mm).

The dual pill of the first and the second slurries also proved to be more efficient than a simple mixture of the first and the second slurries: in the latter case, the mixture of fibers and particulates could not be pumped into the test channel (delivery problem).

Table 4 displays the compositions of slurries and combinations of two slurries for temporary isolation of a narrow vertical channel (an equivalent of a narrow hydraulic fracture) tested using a unit for testing sealant compositions.

A non-damaging composition of a dual sealing pill. The use of the specified volume ratios of the first and the second slurries (varying from 1:5 to 2:1) allows producing a sealing layer, in which the inert particulates (of calcium carbonate) are present not deeper than the first layer. The first slurry of fully degradable components (PLA) comes in contact with the subterranean formation, and this slurry has no damaging effect on the subterranean formation or the proppant pack in the formation. Compositions, in which the second slurry does not penetrate through the first one, are compositions with a non-damaging makeup. The non-damaging composition was assessed visually in said experiments using colored calcium carbonate.

TABLE 4

The efficiency of slurries for isolation and transport

| Test Option | First Slurry (in Aqueous Solution of Guar Gum) Materials PLA/PLA Fibers/particulates (kg/m³) | Second Slurry (in Aqueous Solution of Guar Gum) PLA/carbonate Fibers/particulates (kg/m³) | The ratio of Slurry Volumes | ΔP for Sealing Layer, bar | Non-damaging Treatment (no Formation | Possibility of Slurry Pumping |
|---|---|---|---|---|---|---|
| Separate slurries (for comparison) | | | | | | |
| 001 | 12/12 | — | — | <35 | yes | yes |
| 01 | 0/0 | 1-2/15-30 | — | >140 | no | yes |
| Dual pills | | | | | | |
| 1 | 12/12 | 1-2/15-30 | 1/5-2/1 | >140 | yes | yes |
| 2 | 12/12 | 2/15 | 1/6 | >140 | no | yes |
| 3 | 12/12 | 2/15 | 3/1 | <35 | yes | yes |
| 4 | 12/7 | 2/15 | 1/5 | >140 | no | yes |
| 5 | 12/95 | 2/15 | 1/5 | <35 | yes | no |
| 6 | 1/12 | 2/15 | 1/5 | <35 | yes | yes |
| 7 | 13/12 | 2/15 | 1/5 | >140 | yes | no |
| 8 | 12/12 | 2/14 | 1/5 | <35 | yes | yes |
| 9 | 12/12 | 1/110 | 1/5 | >140 | no | yes |
| 10 | 12/12 | 5/15 | 1/5 | <35 | yes | yes |

The sealing properties of this dual pill of slurries were tested in comparison with slurries fed into the test installation separately.

Polylactic acid (PLA) particulates were selected as degradable particulates and fibers. The length of PLA fibers is in the range from 2 to 5 mm. Fibers are completely dispersed in a viscous aqueous solution. Particulates are added to the fiber-laden slurry.

The example shows that when two slurries with good transport properties (pumping possibility) are pumped, non-damaging isolation (no formation damage) of fissured rock is created.

The test results show that a combination of two filter cakes is more effective. Non-degradable particulates of the second slurry do not penetrate through the first filter cake.

Example 3. Well Killing by Pumping Two Slurries

Five frac collars are installed at wellbore depths: 2,814.39; 2,916.8; 3,139.47; 3,232.42; 3,416.16 meters.

A run-in-hole operation was performed in the interval of 2,400 to 2,814 m, lost circulation of the fluid was detected at 2,814 m. The pumping of a viscous weighted composition (15 m$^3$) did not produce the desired effect, and complete lost circulation was observed.

Maintenance operations (killing) using 15 m$^3$ of REABLOCK™ (second slurry of non-degradable particulates in viscous gel) did not produce a positive result (complete lost circulation of treatment fluid was observed). The slurry composition is shown in Table 5.

TABLE 5

A formulation for preparing water-based REABLOCK ™ block composition

| Input Order | Name of a Reagent | Units of Measurement | Description | Concentration, kg/m$^3$ |
|---|---|---|---|---|
| 1 | REABLOCK ™ MEDIUM | kg/bag | Block composition | 110 |
| 2 | CALCIUM CARBONATE COARSE | kg/bag | Sealing agent | 65 |
| 3 | CALCIUM CARBONATE EXTRA COARSE | kg/bag | Sealing agent | 120 |
| 4 | CALCIUM CARBONATE VERY COARSE (MK 700 MI) | kg/bag | Sealing agent | 65 |

When the block composition is introduced, no pressure rise is observed at the wellhead (no well killing).

The well killing operation was performed by sequential pumping of two slugs (two slurries): 5 m$^3$ slug based on a fibrous additive (first slurry) with subsequent pumping of a REABLOCK™ slug (10 m$^3$). The composition of each slurry is shown in Tables 6 and 7.

TABLE 6

A formulation for preparing water-based REABLOCK ™ and "M-Fiber" block slugs.
REABLOCK ™ block composition

| Input Order | Name of a Reagent | Units of Measurement | Description | Concentration, kg/m$^3$ |
|---|---|---|---|---|
| 1 | REABLOCK ™ MEDIUM | kg/bag | Block composition | 110 |
| 2 | CALCIUM CARBONATE COARSE (MK-400) | kg/bag | Sealing agent | 100 |
| 3 | CALCIUM CARBONATE EXTRA COARSE (PM 1-1.5) | kg/bag | Sealing agent | 120 |
| 4 | CALCIUM CARBONATE VERY COARSE (PM 0-1) | kg/bag | Sealing agent | 100 |

TABLE 7

"M-Fiber" block composition

| Input Order | Name of a Reagent | Units of Measurement | Description | Concentration, kg/m$^3$ |
|---|---|---|---|---|
| 1 | Guar gum | kg/bag | Polymer gellant | 3.6 |
| 2 | FIBER | kg/bag | PLA fibers (4.5 mm length) | 6 |
| 3 | LIME | kg/bag | For pH control | 18 |

Operation Procedure:

Annular Space Sealing.

Pumping 5 m$^3$ of the FIBER block composition from unit No. 1, then 10 m$^3$ of the REABLOCK™ block composition from units No. 2 and No. 3.

Squeezing the combined slug with process waters to the amount of 13 m$^3$. According to calculations, 5 m$^3$ of the FIBER block composition and 3 m$^3$ of the REABLOCK™ block composition should be allowed for as lost circulation. The "head" of the REABLOCK™ block composition is located at a depth of 2,717 m.

The actual situation when the operations were performed:

When the block composition was pumped, a gradual rise in pressure from 0 to 70 atm was detected with 6.7 m$^3$ squeezed (1.7 m$^3$ of the block composition with a fibrous additive entered the formation).

When 10 m$^3$ was squeezed (pad fluid), the pressure at the wellhead increased to 100 atm (to 120 atm for a short time).

When the pumping was brought to a halt, a gradual decrease in pressure to 80 atm was observed. Closing the tube and annular spaces during the technical settling-out.

The block composition is placed under pressure, which indicates that a filter cake (was formed on the wellbore walls. The combined slug proved to be much more efficient than the REABLOCK™ block composition.

After the technical settling-out period, a coiled tubing was run in the hole with washing for bottom-hole cleanout. At the depth of 1,200 m, the circulation reappeared, and the run-in-hole operation was then continued in the interval of 1,200-2,844 m, the lost circulation rate was 3 m$^3$/hour, which indicates a lower level of lost circulation.

7 days later, the production in the killed well resumed. No additional acid treatment was carried out. The remaining filter cake was removed by creating a pressure drawdown. No fibers from the filter cake to the surface was observed in the production fluid. No decrease in the production level was detected, which indicates that the damage to the proppant pack by the damaging agent was reduced to a minimum.

Although a few examples of embodiments of the present disclosure are described in detail hereinabove, those skilled in the art will easily understand that numerous modifications of the given embodiments are possible without a significant deviation from the present disclosure. Accordingly, all such amendments should be included in the scope of the present disclosure, as specified in the following Claims.

The invention claimed is:

1. A method for temporary isolation of a well interval, comprising:
   pumping a first slurry into the well, the first slurry comprising a viscous carrier fluid, degradable particulates, and degradable fibers, until a first filter cake is formed;
   pumping a second slurry into the well, the second slurry comprising a viscous carrier fluid, non-degradable particulates, and degradable fibers, until a second filter cake is formed over the first filter cake; wherein the first and the second slurries are not mixed when pumped into the well, and the ratio of the volume of the first slurry to the volume of the second slurry is 1:5 to 2:1; and
   allowing the first and the second filter cakes to self-degrade, thereby removing the temporary isolation.

2. The method of claim 1, wherein the viscous carrier fluid of either the first slurry or the second slurry is selected from an aqueous solution of a thickening polymer, or an emulsion.

3. The method of claim 1, wherein the degradable particulates and the degradable fibers in either the first slurry or the second slurry are selected from degradable polymers that are selected from polylactic acid, polyglycolic acid and degradable polyesters.

4. The method of claim 1, wherein the non-degradable particulates are selected from calcium carbonate, silica, aluminosilicates, or bauxites.

5. The method of claim 1, wherein the first slurry comprises degradable particulates having the concentration of 8 to 90 kg/m$^3$, and degradable fibers having a concentration of 2 to 12 kg/m$^3$.

6. The method of claim 1, wherein the second slurry comprises non-degradable particulates having the concentration of 15 to 100 kg/m$^3$, and degradable fibers having the concentration in the range of 1 to 4 kg/m$^3$.

7. The method of claim 1, wherein the length of the degradable fibers in either the first slurry or the second slurry is 3 to 10 mm.

8. The method of claim 1, wherein the size of the degradable particulates is in the range of 0.01 to 5 mm.

9. The method of claim 1, wherein the size of the non-degradable particulates is in the range of 0.01 to 1 mm.

10. A method for hydraulic refracturing, comprising:
    pumping a first slurry into a well with hydraulic fractures, the first slurry comprising a viscous carrier fluid, degradable particulates, and degradable fibers until a first filter cake is formed;
    pumping a second slurry into the well with hydraulic fractures, the second slurry comprising a viscous carrier fluid, non-degradable particulates, and degradable fibers until a second filter cake is formed over the first filter cake; wherein the first and the second slurries are not mixed when pumped into the well, and the ratio of the volume of the first slurry to the volume of the second slurry is 1:5 to 2:1; and
    increasing the wellbore pressure to a level above the hydraulic fracturing pressure and performing a hydraulic fracturing operation at a new point.

11. A method for well killing, comprising:
    pumping a first slurry into the well, the first slurry comprising a viscous carrier fluid, degradable particulates, and degradable fibers, until a first filter cake is formed; and
    pumping a second slurry into the well, the second slurry comprising a viscous carrier fluid, non-degradable particulates, and degradable fibers, until a second filter cake is formed over the first filter cake, wherein the first and the second slurries are not mixed when pumped into the well, thereby temporarily killing the well.

12. The method of claim 11, wherein the ratio of the volume of the first slurry to the volume of the second slurry is 1:5 to 2:1.

13. The method of claim 11, wherein the first and second filter cakes are removed by pressure drawdown in the wellbore.

* * * * *